(12) United States Patent
Laurence (10) Patent No.: US 9,499,716 B2
(45) Date of Patent: Nov. 22, 2016

(54) METHODS AND APPARATUS FOR STABILIZATION OF SURFACES

(71) Applicant: POLYLAST SYSTEMS, LLC, Scottsdale, AZ (US)

(72) Inventor: Peter J. Laurence, Scottdale, AZ (US)

(73) Assignee: Polylast Systems, LLC, Scottsdale, AZ (US)

( * ) Notice: Subject to any disclaimer, the term of this patent is extended or adjusted under 35 U.S.C. 154(b) by 0 days.

(21) Appl. No.: 14/511,094

(22) Filed: Oct. 9, 2014

(65) Prior Publication Data

US 2015/0023732 A1  Jan. 22, 2015

Related U.S. Application Data (63) Continuation-in-part of application No. 13/702,644, filed as application No. PCT/US2011/040108 on Jun. 10, 2011, now abandoned.

(60) Provisional application No. 61/397,342, filed on Jun. 10, 2010.

(51) Int. Cl.
  *C09D 163/00* (2006.01)
  *C09D 175/04* (2006.01)
  (Continued)

(52) U.S. Cl.
  CPC .......... *C09D 163/00* (2013.01); *C08G 18/307* (2013.01); *C09D 175/04* (2013.01); *C09J 175/04* (2013.01); *E01C 11/005* (2013.01); *C08L 95/00* (2013.01)

(58) Field of Classification Search
  CPC ...... E01C 19/48; E01C 23/06; E01C 23/065; E01C 23/11; E01C 23/05; E01C 11/005
  USPC ............................... 404/25, 26, 107, 108, 75
  See application file for complete search history.

(56) References Cited

U.S. PATENT DOCUMENTS

| 1,701,497 A | 2/1929 | Heath |
| 4,536,103 A | 8/1985 | Prescott |

(Continued)

FOREIGN PATENT DOCUMENTS

| JP | 05-001426 A | 1/1993 |
| JP | 08311349 A * | 11/1996 |

(Continued)

OTHER PUBLICATIONS

Federal Highway Administration, U.S. Department of Transportation, "Manual of Practice: Materials and Procedures for Repair of Potholes in Asphalt-Surfaced Pavements," Report No. FHWA-RD-99-168, 1999.

(Continued)

*Primary Examiner* — Abigail A Risic
(74) *Attorney, Agent, or Firm* — The Noblitt Group, PLLC (57) ABSTRACT

Various embodiments provide surface compositions and methods for repairing durable and/or load-bearing surfaces including roadway voids, manhole structures, and/or safety flooring. Compositions and methods may comprise utilizing a liquid binder, catalyst, and/or primer to provide durable, waterproof, and/or long-lasting surface compositions to dispose within the roadway voids and/or to coat flooring. The surface compositions may cure rapidly through an internal exothermic reaction process to form the repair and/or the safety flooring. In some embodiments, filler materials may be disposed within the liquid binders to provide elasticity, compression, slip resistance, heat transfer, reduced cure time, and/or a desired surface texture to the surface composition.

30 Claims, 6 Drawing Sheets

(51) Int. Cl.
*E01C 11/00* (2006.01)
*C08G 18/30* (2006.01)
*C09J 175/04* (2006.01)
*C08L 95/00* (2006.01)

(56) References Cited

U.S. PATENT DOCUMENTS

| | | | | |
|---|---|---|---|---|
| 4,744,700 | A | * | 5/1988 | Andy ................... C09K 17/30 |
| | | | | 264/31 |
| 4,781,490 | A | | 11/1988 | Jelling |
| 4,948,431 | A | | 8/1990 | Strickland et al. |
| 5,030,030 | A | | 7/1991 | Simmonds |
| 5,254,405 | A | * | 10/1993 | Panaroni ................ C08L 75/04 |
| | | | | 36/25 R |
| 5,556,225 | A | | 9/1996 | Marino |
| 5,584,597 | A | | 12/1996 | Lemelson |
| 6,012,870 | A | | 1/2000 | Dillingham |
| 6,362,257 | B1 | | 3/2002 | Chehovits et al. |
| 6,439,806 | B1 | | 8/2002 | Dillingham |
| 6,605,650 | B1 | * | 8/2003 | Roth ..................... C08J 9/0061 |
| | | | | 521/134 |
| 2003/0084826 | A1 | * | 5/2003 | McNulty, Jr. .......... C04B 28/00 |
| | | | | 106/817 |
| 2003/0149320 | A1 | * | 8/2003 | Gajda ...................... C07C 2/66 |
| | | | | 585/446 |
| 2004/0116557 | A1 | * | 6/2004 | Pounds ................ C04B 26/045 |
| | | | | 524/59 |
| 2004/0146351 | A1 | | 7/2004 | McIntosh |
| 2005/0131128 | A1 | * | 6/2005 | Hughes ................ E01C 11/005 |
| | | | | 524/494 |
| 2007/0221099 | A1 | * | 9/2007 | Mintz .................. C04B 28/342 |
| | | | | 106/692 |
| 2008/0044225 | A1 | | 2/2008 | Swartz |
| 2008/0194735 | A1 | * | 8/2008 | Verdugo-Perez ....... C04B 26/18 |
| | | | | 524/4 |
| 2008/0210127 | A1 | * | 9/2008 | Bindschedler ....... C09D 195/00 |
| | | | | 106/275 |
| 2011/0274490 | A1 | * | 11/2011 | Vitale .................... C04B 26/06 |
| | | | | 404/82 |
| 2015/0252533 | A1 | * | 9/2015 | Hendrickson ........... E01C 7/147 |
| | | | | 404/75 |

FOREIGN PATENT DOCUMENTS

| | | | |
|---|---|---|---|
| JP | 2000-273885 A | 10/2000 | |
| JP | 2003-247202 A | 9/2003 | |
| JP | 2005-220733 A | 8/2005 | |
| WO | WO 2009095476 A1 * | 8/2009 | ............. C08K 5/098 |

OTHER PUBLICATIONS

TechCrete Installation Instructions, Apr. 2011, accessed Dec. 5, 2012, http://www.crafco.com/PDF%20Files/Application%20Inst/TechCrete%20Installation%20Instr.pdf.
Degadeck Polymer Concrete Product Data, 2010, accessed Dec. 5, 2012, http://www.buildingsystems.basf.com/p02/USWeb-Internet/buildingsystems/en_GB/content/microsites/buildingsystems/products/items/Degadeck_Polymer_Concrete.
PatchMaster—High Performance Pothole, 2012, accessed Dec. 5, 2012, http://www.sealmaster.net/PatchMaster.shtml.
Asphalt Binder, An Asphalt Emulsion Tack Coat Designed for Priming Oxidized Surfaces and Patchwork, 2012. Accessed Dec. 5, 2012, http://www.sealmaster.net/Asphalt%20Binder.shtml.
Brachman, Steve, "How to Pour Concrete Around Manholes," 2012, accessed Dec. 5, 2012 http://www.ehow.com/how_5525031_pour-concrete-around-manholes.html.
EZ Street Cold Asphalt, "Manholes, Water Valves, Drains, " 2012, accessed Dec. 5, 2012, http://www.ezstreetasphalt.com/contractor/water-valve-surrounds/.

* cited by examiner

METHODS AND APPARATUS FOR STABILIZATION OF SURFACES

CROSS-REFERENCES TO RELATED APPLICATIONS

This application is a continuation-in-part of U.S. patent application Ser. No. 13/702,644, filed on Jan. 18, 2013, entitled "Manhole, Roadway and Walkway Repair," which is the National Stage Entry of International Patent Application No. PCT/US11/40108, filed on Jun. 10, 2011, designating the United States of America, which claims priority to U.S. Provisional Patent Application Ser. No. 61/397,342, filed on Jun. 10, 2010, and incorporates the disclosure of all such applications by reference. To the extent that the present disclosure conflicts with any referenced application, however, the present disclosure is to be given priority.

BACKGROUND

Various materials used to construct durable and/or load bearing surfaces such as asphalt and concrete may deteriorate and erode over time. For example, on surfaces such as highways, rural roadways, airport taxiways and aprons, commercial or industrial parking facilities, erosion may appear as expanding roadway voids, potholes, and/or cracks in the surface which can increase in depth, length, width and circumference. Over time the deterioration of the surface may continue and the erosion and may grow past being inconvenient nuisances and become serious safety hazards that may need repair before the surface can be resurfaced. If the voids erode into the subsurface, then expensive major resurfacing of the area may become necessary. In addition, surface deterioration may increase the liability exposure resulting from damage or harm to vehicles and equipment that travel on the surfaces, as well as to the operators of such equipment and any persons in the vicinity.

Similarly, the asphalt or concrete surface surrounding manhole structures in a roadway may deteriorate to produce uneven surfaces which disrupt traffic and create liabilities for damage or injury. After a road is paved or resurfaced, the top of the manhole must be at the same level as the surrounding concrete or asphalt road surface. Typically, this is assured by breaking up the concrete or asphalt immediately surrounding the manhole ring and raising the top of the manhole cover and ring to the new road level. Liquid concrete may then be poured around the manhole ring to a form a collar even with the roadway so that traffic can pass safely and smoothly over the covered manhole and its collar.

Existing repair processes of asphalt or concrete roadway surfaces and manhole structures may be expensive and/or ineffective. For example, surface repairs, where an inexpensive material such as a cold-patch or hot-patch asphalt, oil, tar or similar carriers are poured and/or tamped into the voids may be ineffective, short lived, and offer a poor value proposition over time. While the cost of the repair material itself may be low, the special equipment and labor required to apply them are substantial and often the costs of road closure, traffic re-routing and the corresponding costs of special equipment, permits, flag people, sheriff or police, signage, etc. can be significant. Further, ASTM (formerly known as American Society for Testing and Materials) report for strength, elongation, and adhesion of existing repair processes are inadequate. As a result, while the price of the repair materials alone may be low, the total cost of repairs, especially when considering their life expectancy, may not offer a cost-effective long-term solution.

SUMMARY

Various embodiments provide surface compositions and methods for repairing durable and/or load-bearing surfaces including roadway voids, manhole structures, and/or safety flooring. Compositions and methods may comprise utilizing a liquid binder, catalyst, and/or primer to provide durable, waterproof, and/or long-lasting surface compositions to dispose within the roadway voids and/or to coat flooring. The surface compositions may cure rapidly through an internal exothermic reaction process to form the repair and/or the safety flooring. In some embodiments, filler materials may be disposed within the liquid binders to provide elasticity, compression, slip resistance, heat transfer, reduced cure time, and/or a desired surface texture to the surface composition.

BRIEF DESCRIPTION OF THE DRAWING FIGURES

A more complete understanding of the present invention may be derived by referring to the detailed description when considered in connection with the following illustrative figures. In the following figures, like reference numbers refer to similar elements and steps throughout the figures.

Elements and steps in the figures are illustrated for simplicity and clarity and have not necessarily been rendered according to any particular sequence or scale. For example, steps that may be performed concurrently or in different order are illustrated in the figures to help to improve understanding of embodiments of the present invention.

The figures described are for illustration purposes only and are not intended to limit the scope of the present disclosure in any way. Various aspects of the present invention may be more fully understood from the detailed description and the accompanying drawing figures, wherein.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, the present invention may employ various process steps, apparatus, systems, methods, materials, etc. In addition, the present invention may be practiced in conjunction with any number of devices used to mix components, repair road surfaces, install flooring, and/or inhibit concrete or asphalt degradation, and the system described is merely one exemplary application for the invention.

The particular implementations shown and described are illustrative of the technology and its best mode and are not intended to otherwise limit the scope of the present technology in any way. For the sake of brevity, conventional manufacturing, preparation, process steps, and other functional aspects of the composition may not be described in detail. Furthermore, connecting lines shown in various figures are intended to represent exemplary functional relationships and/or steps between the various elements. Many alternative or additional functional relationships or process steps may be present in a practical composition and method.

Various embodiments of the present technology provide compositions, methods, and systems for making surface composition and applying the surface composition durable and/or load-bearing surfaces such as asphalt and/or concrete surrounding manhole structures, roadway voids, and/or a flooring to form a safety flooring for at least one of human traffic and animal traffic. A detailed description of various embodiments is provided as a specific enabling disclosure that may be generalized to any application of the disclosed composition and methods in accordance with the various described embodiments.

In various embodiments, representative surface compositions and installation methods thereof may employ quick curing materials that may adhere to the roadway or surface surrounding the manhole being repaired and/or the flooring surface receiving the surface composition. In some embodiments, the utilization of the surface compositions may reduce repair time and/or lengthen the lifetime of the repair, which may provide savings for payers. For example, a quick installation of the safety flooring for businesses such as dairies and veterinarian clinics may reduce the time for closure of animal pens which may cause stress or discomfort to the animals or economic loss to the facility if closed for prolonged periods.

Representative methods of applying the surface composition to the roadway or flooring surface may be performed with conventional road maintenance equipment and vehicles. Expensive, specialized equipment and/or skilled tradesmen for delivering and/or installing the surface composition may be reduced or eliminated.

Various representative implementations of the present surface composition technology may be applied to any durable and/or load-bearing surface such as a void in a roadway for vehicular traffic, a flooring to form and overlaying safety flooring, and/or damaged areas surrounding structures in a roadway including manhole structures. In various embodiments of the present technology, the surface composition may comprise one or more of a primer, a liquid binder, and a filler material. Various embodiments of the surface composition may provide practical utilization of the technology in a wide range and size of applications without specialized equipment, heat, pressure, and/or skilled tradesmen.

In various embodiments of the present technology, the surface composition may achieve desired physical properties of durability and/or elongation capabilities to allow the surface composition to expand and contract with ambient temperature variations. Some embodiments of the surface composition may exhibit resistance to penetration by water, strength, compaction capability, adherence to the surrounding surface, and/or stabilization of the surrounding surface. In some embodiments, by having the ability to expand and contract, the surface composition may resist cracking or separating from the edges of the receiving surface and/or may compress when the surrounding surface expands and contracts with temperature change.

In some embodiments, the surface composition may have an initial viscosity level that allows the surface composition to flow freely and/or penetrate into any opening in, around and/or under the surface. As the liquid binder of the surface composition cures, the viscosity of the surface composition may increase substantially such that the surface composition becomes a near solid after curing. In some embodiments, the surface composition may be formulated to create a thermo-catalytic effect that may allow application of the surface composition even if the receiving surface is not dry.

The surface composition may comprise any suitable component or mixture of components. For example, in some embodiments, the surface composition may comprise multiple components mixed together and allowed to cure. In one embodiment, the components and/or amount of components in the surface composition may be varied to control the final hardness of the surface composition as well as controlling the timing for the surface composition to harden. In various embodiments, the surface composition may be delivered to the site of the surface to receive the surface composition, ready to apply such that the application does not need special skills, materials, and/or equipment to apply the surface composition to the surface. Accordingly, municipalities, agencies, associations, and/or untrained individuals may affect the repair.

In various embodiments of the present technology, the surface composition may comprise a primer. In one embodiment, the primer may comprise any material that may adhere to the surface such as a roadway void, flooring, and/or surface surrounding a manhole. In various embodiments, the primer may be moisture resistant such that the primer may be applied to surfaces that have moisture. The primer may also exhibit adhesion, cohesion, and/or tensile strength to substantially permanently adhere to the edges and bottom of the roadway void or other surface and may have elongation capabilities at low tension pressures such that the primer will resist fatigue and/or reduce fracture of adjacent surfaces. In some embodiments, a rigorous preparation of the surface may not be required before the primer is applied to the surface.

In some embodiments, the primer may comprise an epoxy that may cure in the presence of moisture and/or in the substantial absence of oxygen and/or moisture. In one embodiment, the primer may comprise a flexible epoxy. In various embodiments, the flexible nature of the epoxy may enable the filler material, which may be capable of expansion and/or contraction even when substantially fully cured, to adhere to the bottom and edges of the surface so as to maintain a waterproof attachment through a broad range of temperature variations.

Exemplary primers of the surface composition may comprise a variety of urethanes, epoxies, wetting agents and catalyst. In various exemplary embodiments, the primer may comprise one or more of PolyPrimer 2-part Epoxy coating (American Synthetics), Stobicoatg N870 2-part Epoxy primer (Stockmeier), and/or #10 Mortar Adhesive Binder (Epoxy.com). However, it is understood that those skilled in the art may select various primers based on the characteristics of the chemical compounds and/or compatibility with the ingredients used in the filler material. In some embodiments, those skilled in the art may readily adapt the type and/or proportion of the filler and the primer to produce the desired characteristics, such as density, compressibility, elongation, and/or cure time for the particular conditions and composition of the surface.

In various embodiments of the present technology, the surface composition may comprise a liquid binder comprising at least one of urethane, poly urea, a hybrid material, flexible epoxy or other suitable chemical or chemical mix of polyurethane. In addition, in some embodiments, water may be substantially absent from the liquid binder which may allow the application of the surface composition to be performed below freezing temperatures and/or where the surface is not dry (ie., contains moisture). The polyurethane may be made by a reaction between a first component comprising a polyol and a second component comprising an isocyanate, wherein an exothermic reaction is initiated upon at least one of: (1) the mixing of the first component and the second component and (2) the exposure of the liquid binder to air.

The polyurethane may be adapted to cure through an internal exothermic reaction where heat is generated during the polymerization process. Such polyurethanes may not need the application of external heat sources to affect curing, such as pre-heating the liquid binder prior to application to the surface. Such polyurethanes be referred to as thermoset polyurethanes. In some embodiments, thermoset polyurethanes may cure at room temperature or slightly above room temperature.

In various embodiments of the present technology, the polyol of the first component may comprise one or more conventional polyols. For example, in some embodiments, the polyols may comprise at least one of polycarbonate polyols, polycaprolactone polyols, polybutadiene polyols, fluorinated polyols, and/or polysulfide polyols which may provide adhesive and/or elastomeric properties to the liquid binder.

In some embodiments, the first component may further comprise a catalyst to initiate curing of the polyurethane. For example, the catalyst may comprise a metal catalyst comprising mercury, lead, tin, bismuth, and/or zinc. In one embodiment, the tin catalyst may comprise Fomrez tin catalysts. In some embodiments, the catalyst may be sprayed over the liquid binder after the liquid binder is applied to the surface. In various embodiments, the amount of catalyst which may be adjusted to alter the curing time. This capability may allow the curing process to be effective regardless of temperature or type of surface material to which the surface composition is being applied. In some embodiments, the first component may be stored in a container to be delivered to the site of the surface.

In various embodiments, the first component may further comprise an additive. In one embodiment, the additive may comprise a pigment for aesthetic matching to the surface adjacent to the area of the surface to which the surface composition is applied. In another embodiment, the additive may comprise an edge retention composition to prevent or reduce pull-back of the liquid binder from the surface or from the primer. In another embodiment, the additive may comprise a substance for abrasion resistance such as ceramic particles. In another embodiment, the additive may comprise a chain extender and/or cross linker for modifying the structure of the resulting polyurethane to enhance properties such as tensile strength, elongation, and/or tear resistance.

In another embodiment, the additive may comprise an expander material that may increase the volume of the liquid binder for applications such as covering large flooring areas and/or large roadway voids where a significant volume of liquid binder may be needed. The expander material may comprise any compound that increases the volume of the liquid binder without adversely affecting the liquid binder's ability to cure. For example, in one embodiment, the expander material may comprise butanediol.

In various embodiments of the present technology, the isocyanate of the second component may be suitably adapted to initiate the catalytic reaction to cure the liquid binder. For example, in one embodiment, the isocyanate may comprise an aromatic diisocyanate. In various exemplary embodiments, the liquid binder may comprise one or more of #3508 aromatic one part urethane (Marchem), Stobielast S 136 (Stockmeier), Elastotie G10614T Isocyanate (BASF), Elastotite G20114R and G20114T two component urethane coating (BASF).

In various embodiments, the second component may be stored in a second container that may also be delivered to the repair site. The two containers together may be part of a premeasured installation package according to predetermined application size, such as the size of the roadway void to be repaired or the area of the flooring receiving the safety flooring. For example, the installation package may contain an amount of each component of the surface composition suitable for small roadway voids (cracks), large roadway voids (potholes, such as with a volume of many gallons). Each container may comprise any suitable size from a one liter pail to any size up to large fifty-five gallon drums or totes. In various embodiments, the containers and/or kits containing the components of various embodiments of the surface composition may have a substantially long shelf life for long-term storage. For example, where the surface is a large area such as a flooring or a large or multiple roadway voids (such as deep fissures or potholes), a two-part pumping system may be employed where drums or totes of the first and the second components are available on a movable platform such as a trailer or truck which may be large enough to hold the components of the surface composition and the two-part mixing delivery system for the liquid binder. In one embodiment, the delivery system may comprise a wand configured to move over the roadway void and may deliver the mixed first and second components as a drip-flow and/or spray.

In various embodiments of the present technology, the filler material may be mixed with the liquid binder prior to curing and/or application of the liquid binder to the surface. In some embodiments, the filler material may be applied to over the top of the liquid binder after the liquid binder is applied to the surface. In various embodiments, the filler material may have one or more desired physical ASTM specifications. For example, in some embodiments, the filler material may have an ASTM D5329 tensile adhesion of 155%, an ASTM tensile strength of psi 53.3, an ASTM D5329 non-immersed bond at −29° C. (% Recovery, Passed), an ASTM D5329 resilience at 25° C. of 60 minutes. Additionally, in some embodiments, the filler material may exhibit an ASTM D5329 asphalt compatibility without adhesion failure, formation of oily exudate at the interface of sealant and asphalt concrete, or softening and/or other deleterious effect.

In various embodiments, the filler material may comprise recycled rubber pellets, synthetic rubber, recycled asphalt, asphalt pellets, pebbles, pea gravel, recycled SBR rubber crumb, aggregate of various sizes, and/or other materials having similar properties, including any material that one of ordinary skill in the art would appreciate as interchangeable with those described above. In another embodiment, the filler material may comprise an elastic liquid that may be fast-curing and may increase durability (to the pounding of a paved surface). For example, the filler material in this embodiment may be strong (with a tensile break elongation of about 75% and a peak stress of about 60 psi) yet may also acts as a cushioning surface. In various embodiments, the filler material may be sourced from a variety of manufacturers such as BASF, Stockmeier, APF, Marchem, Key Resin and/or Degussa construction chemicals.

In one embodiment, the filler material may be pre-coated with urethane, wetting agent, and/or the catalyst and mixed together with a primer and/or a colorant. Such a combination may encapsulate the filler material. In some embodiments, the filler material may be sent to users as part of an installation package. The installation package may include the pre-coated filler material and/or pre-measured containers of the primer, liquid binder, and/or additives to be combined on the site of the surface to be repaired or covered or may be combined off the site of the surface.

In an exemplary embodiment, the filling material may be made by placing a desired amount of the filler such as pre-coated rubber into a portable mixer, adding a predetermined (by weight) amount of the primer, liquid binder, and/or additives, and mixed. The filler material may then be poured into the roadway void, the damaged surface around the manhole, and/or over the flooring receiving the safety flooring. The amounts of filler material and the primer, liquid binder, and/or additives may be varied to control the final hardness of the filler material and/or to control the amount of time required for the filler material to harden. For example, in one embodiment, one mixture may accelerate hardening and increase the hardness of the filler material while another mixture combination may allow more time for placement of the surface composition into and/or over the surface to form a more compliant resulting surface composition.

Exemplary methods of applying the surface composition to the surface may comprise repairing a roadway void comprising a cavity having a bottom and sides. In some embodiments, the liquid binder and primer may be prepared in a large mixer in a construction yard. Separate containers may be filled with the liquid binder and primer, loaded onto any available vehicle and taken to preplanned routes for repair of numerous sites. In another embodiment, a reactive kit of small containers of liquid binder and primer and packages of the other additives may be supplied to city workers to immediately fill a pothole they encounter.

Figure 11:
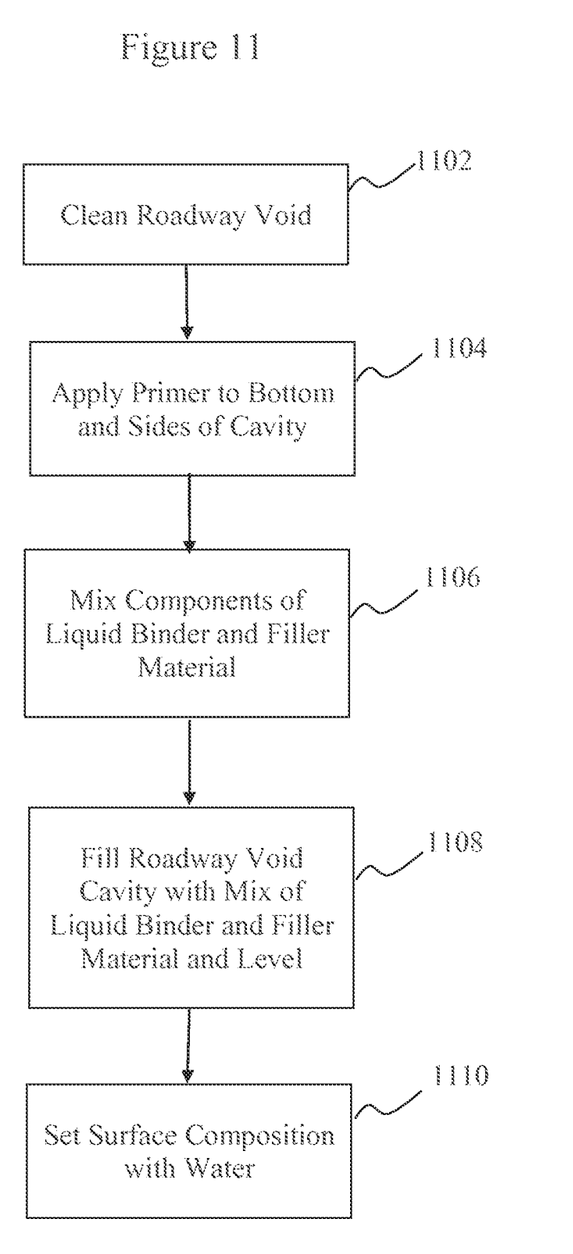
FIG. 11 is a flow chart illustrating an exemplary method of repairing a roadway void.

Referring to FIG. 11, an exemplary method of repairing the surface may comprise cleaning the surface of the roadway void (i.e., pothole) which may refer to any crack, hole, opening, or flaw in a roadway, pathway or expansion joint (1102). The pothole edge and surroundings may be cleaned and damaged, loose asphalt or concrete may be removed with a simple sweeping and/or vacuuming. The cleaned site may be prepared by applying primer and catalyst to the bottom and side surfaces within the cavity of the roadway void (1104). In some embodiments of the method, the primer and/or catalyst may be sprayed onto the bottom and side surfaces of the cavity to provide thorough coverage of the surface area. In other embodiments, the primer and/or catalyst may be brushed and/or rolled onto the bottom and side surfaces of the cavity. The liquid binder and filler material may be combined on site of the roadway void (or remotely according to the preference of the user) or premixed liquid binder with filler material may be provided (1106). In some embodiments, the liquid binder may begin to cure upon mixing the first component and the second component of the liquid binder. In other embodiments, the liquid binder may begin to cure upon contact with the air.

The liquid binder and filler material may be applied to partially or entirely fill the roadway void and optionally leveled with a trowel or other leveling device (1108). In some embodiments, such as where the roadway void is very deep, the filler material alone may be poured into the roadway void, followed by adding the mixture of the liquid binder and filler material over the layer of filler material until it is level with the roadway. Another application of catalyst may be sprayed onto the filled roadway void. In some embodiments a layer of primer may be applied over the leveled liquid binder and filler material. If no additional layer of filler material needs to be applied over the filled roadway void (such as to provide further traction for vehicles), the surface composition may be sprayed with water (1110). The water spray may quickly set the surface composition and may allow motor vehicles on the repaired surface in less than an hour. In some embodiments, the motor vehicles may return to the repaired surface in less than 20 minutes after the surface composition is applied to the roadway void. In another embodiment, the motor vehicles may return to the repaired surface in less than 10 minutes after the surface composition is applied to the roadway void.

In various embodiments of the present technology the repaired roadway void may last approximately as long as the surrounding surface lasts due to the resiliency and adherent properties of the surface composition to the subsurface (bottom and sides of the cavity of the roadway void) and surrounding surface. The surface composition may prevent or reduce moisture seepage into the repaired roadway void, which may prevent the surface composition from floating in the roadway void cavity, and may prevent dislodging of the surface composition when vehicles pass over the repaired roadway void. In the method according to the embodiment, the surface composition and/or the seal between the surrounding surface and the surface composition may be substantially non-porous. Accordingly, moisture or other liquids may not pass through the surface composition. In addition, the integrity and longevity of the repair of the roadway void may be enhanced by the capability of the surface composition to expand and contract with temperature changes.

Exemplary methods of applying the surface composition to the surface may comprise repairing a manhole structure or similar structures in roadways that may be surrounded by damaged asphalt, concrete, or other roadway surface. Some conventional manhole repair processes may utilize a process comprising resurfacing the roadway where the manhole cover structures are freed with a jackhammer, manually raised to the level of the new surface, and concreted in place again. These steps may require two types of tradesmen, specialized single purpose equipment and may take days to complete. Some conventional manhole repair processes may utilize concrete collars around the manhole structures, which may cause the concrete to prematurely weaken before the surrounding road. Roadway resurfacing may raise the level of the roadway, time, material cost, and personnel costs may be incurred to raise the level of the manhole structure. Eliminating the steps to raise the manhole structure and the concrete collar, the manhole cover and its ring may be protected during resurfacing and then cleaned.

In various embodiments, the method for repairing the manhole structure may comprise placing a thin separator between the manhole cover and its ring. Primer may then be applied to the manhole cover and/or surrounding asphalt and/or concrete to be resurfaced. The liquid binder and/or filler material of the surface composition may be applied to the manhole cover and ring until its level is even with the level of the roadway. It does not matter if the manhole cover and ring are askew, and variable amounts of surface composition are applied to different sides. The catalyst may then be applied to the manhole cover and ring. After a short delay, the lid ring separator may be removed, which may leave a space between the manhole cover and ring, permitting the usual easy removal of the manhole structure cover as needed.

Alternately, if the surrounding asphalt and/or concrete around the manhole structure is not damaged, it may not need replacement. Exemplary methods comprise cleaning the damaged surface, priming, and filling the damaged surface with the liquid binder and filler, followed by adding an optional coating with catalyst and water. This simplified process may save considerable time, materials and personnel cost. Where a user desires to replace the concrete and/or asphalt surrounding the manhole structure, new concrete may be poured in a collar shape but only to several inches under the surrounding roadway. The surface material of the present technology may then be applied (such as with troweling) onto the wet concrete. The surface material may dry much faster than the wet concrete and may provide a stable surface within about two hours, decreasing the usual delay time for concrete curing, providing a resilient surface that lasts longer, and/or increases the longevity of the underlying concrete collar.

Figures 1, 2:
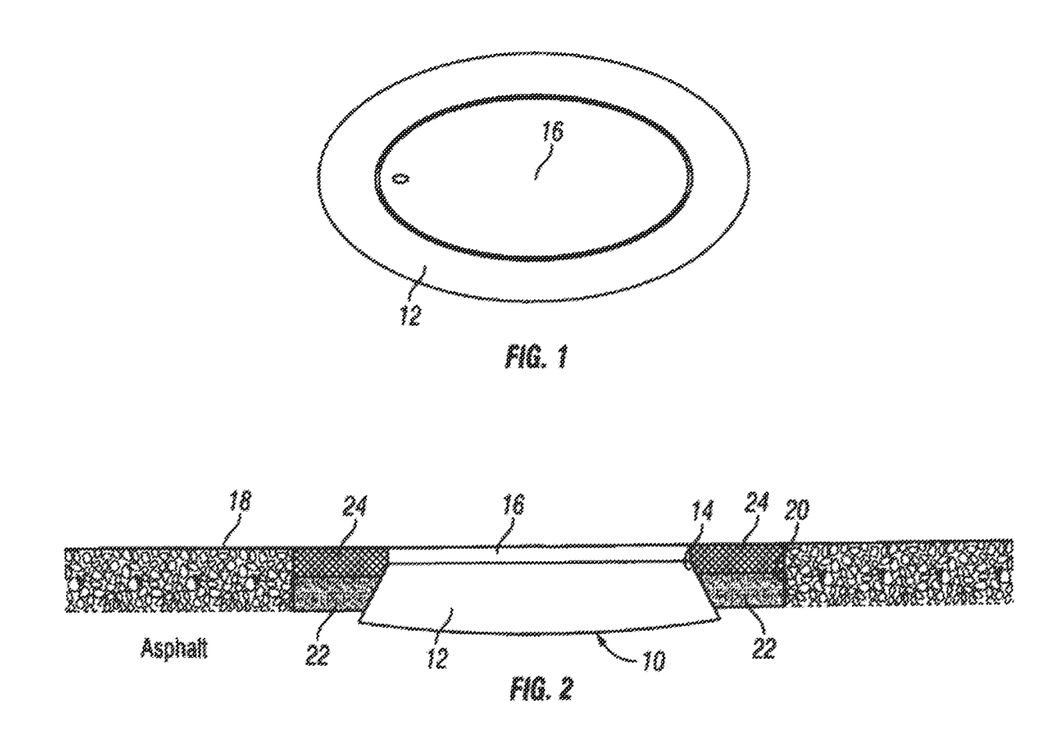
FIG. 1 representatively illustrates a perspective view of a manhole lid surrounded by a collar performed utilizing a prior art process.
FIG. 2 representatively illustrates a sectional view of a manhole structure including a filling material applied over a concrete collar in a ring-surround area around a manhole structure according to one embodiment of the invention.
Figure 3:
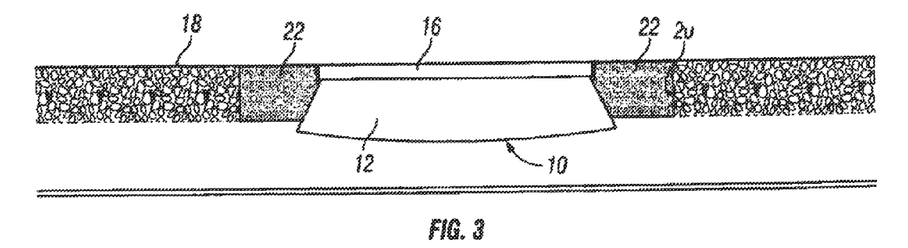
FIG. 3 representatively illustrates a sectional view of a manhole structure, including a ring and a lid, with a concrete collar disposed within a ring-surround area along a road ready to be resurfaced.

Referring now to FIG. 1, a conventional configuration for an area surrounding the manhole structure is shown and includes a concrete collar formed around a manhole ring and lid. The concrete collar may be formed when a road is paved or resurfaced with asphalt to provide rigidity in the area surrounding the manhole structure. Concrete however may deteriorate over time.

Referring to FIG. 2, a method according to one embodiment of the invention is provided to address the deterioration problem with concrete collars. FIG. 2 shows a manhole structure, generally shown at 10, having a ring or frame 12 that defines an opening 14. A lid 16 engages the ring 12 to cover the opening 14. The lid 16 is removable to allow access to an area below the manhole structure 10 via the opening 14. The manhole structure 10 is disposed along a road 18 that may be paved using asphalt or concrete. It is desired that the road 18 and the ring 12 of the manhole structure 10 be at the same level to ensure that traffic can pass safely and smoothly over the manhole structure 10.

The method according to one embodiment includes the step of removing the asphalt in a ring surround area 20 after the road 18 has been paved or resurfaced. The ring surround area 20 may be generally circular but it is appreciated that the particular shape and size of the ring surround area 20 may vary. Concrete is then poured into the ring surround area 20 to form a collar 22. The particular height of the collar 22 may vary. However, the collar 22 will not be at the same level as the paved or resurfaced road 18. When the concrete is still wet, a surface composition 24 is poured on top of the collar 22. The surface composition 24 may be troweled to its desired form. Finally, the surface composition 24 may be allowed to cure using a spray mist of catalyst and/or water.

When the manhole structure 10 is being repaired in an existing roadway (where the road is not being resurfaced), the use of the surface composition 24 may reduce the amount of time that traffic needs to be diverted around the repair by five or more hours. This may significantly reduce labor, equipment, and materials costs.

The resulting joint where the manhole ring 12 or the collar 22 meets the road 18 is smoother. Also, both the manhole structure 10 and vehicles passing over the manhole structure 10 will not take as large punishment due to the shock absorbing qualities of the surface composition 24. Further, the processes set forth in the described embodiments will reduce maintenance costs when compared to typical existing processes.

It is also appreciated that in an alternative embodiment, the surface composition 24 may be poured around the ring surround area 20 in the absence of a concrete collar 22.

Figure 4:
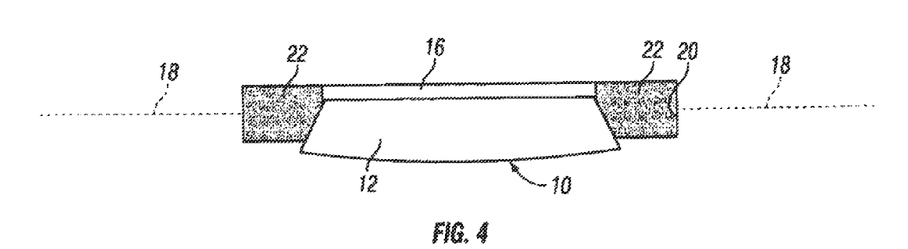
FIG. 4 representatively illustrates a sectional view of the manhole structure and concrete collar wherein an asphalt road surrounding the collar has been ground down.
Figure 5:
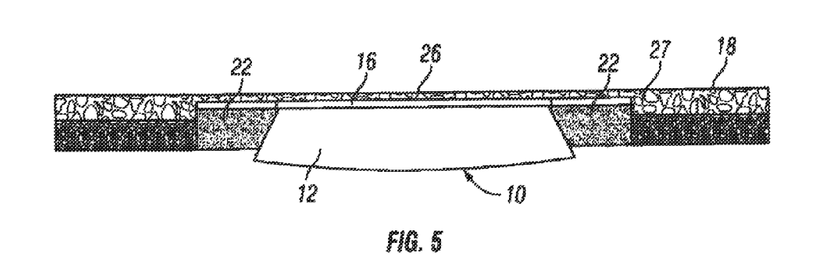
FIG. 5 representatively illustrates a section view of the manhole structure wherein a cover has been applied over the manhole structure and the collar according to another embodiment of the invention.
Figure 6:
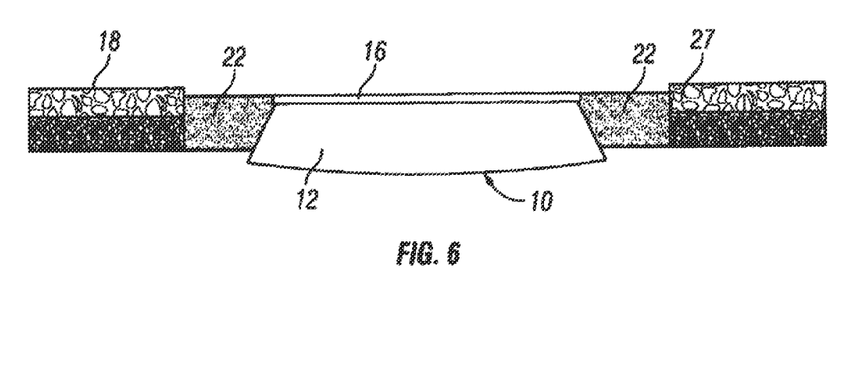
FIG. 6 representatively illustrates a sectional view of the manhole structure wherein the cover, and the asphalt on the cover, have been removed.

Referring to FIGS. 3 through 10, a method according to another embodiment is provided for raising a height of the manhole structure 10 and the collar 22 to the level of the road 18 that has been resurfaced. As mentioned above, the manhole structure 10, including its ring 12 and lid 16, may be surrounded by the collar 22. Initially, the manhole structure 10, the road 18, and the collar 22 may be at the same height. The resurfacing process may begin by grinding down the asphalt, as shown in FIG. 4, to prepare the road 18 for a new asphalt layer 27. Before the new asphalt layer 27 is laid down, a cover 26 is positioned over the manhole structure 10 and the collar 22 to protect the lid 16 and the collar 22 from direct contact with the new asphalt layer 27. The cover 26 in one embodiment may be formed from metal but it is appreciated that the cover 26 may be formed from any of numerous materials. The new asphalt layer 27 is then laid down over the road 18 and the cover 26, as shown in FIG. 5. After the resurfacing of the road 18 is complete, the cover 26 and the new asphalt poured on the cover 26 are removed from the manhole structure 10. At this point, the manhole structure 10 may be at the same level as it was before the resurfacing process started, and the road 18 may be at a new level that is higher than the manhole structure 10 (as shown in FIG. 6).

Referring to FIGS. 7 through 10, a separator ring 28 is applied around the lid 16 of the manhole structure 10. The separator ring 28 may include an elongated main body 30 having opposing ends 32, 34. Male 36 and female 38 adjusters may be located at the respective opposing ends 32, 34 to allow the separator ring 28 to fit around lids 16 of varying sizes. The separator ring 28 also may include at least one handle or ring lifter 40 extending upwards from the main body 30 to allow removal of the separator ring 28, as described in further detail below. A lifting hole plug 42 may be applied to any lifting holes in the lid 16 of the manhole structure 10 at the same time that the separator ring 28 is positioned around the lid 16. The lifting hole plug 42 may be coupled to the separator ring 28 or separate therefrom.

Figure 7:
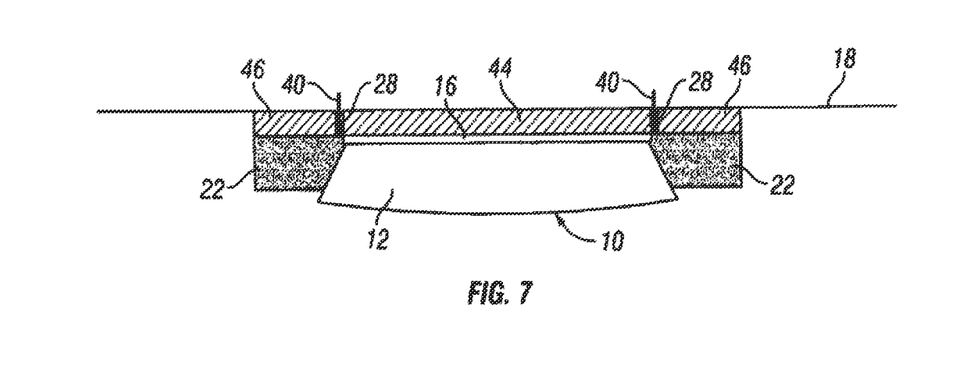
FIG. 7 representatively illustrates a sectional view of the manhole structure including the filling material poured on top of the lid and the collar to a level even with a new asphalt layer.
Figure 8:
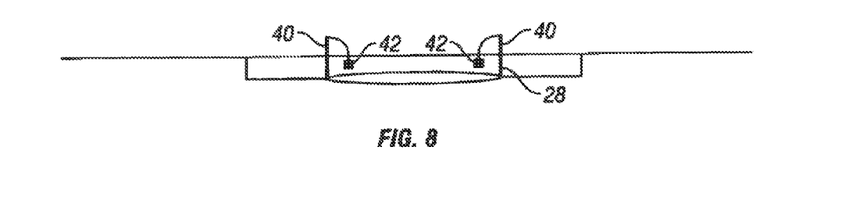
FIG. 8 representatively illustrates a sectional view of the manhole structure including a separator ring applied around the lid.
Figure 9:
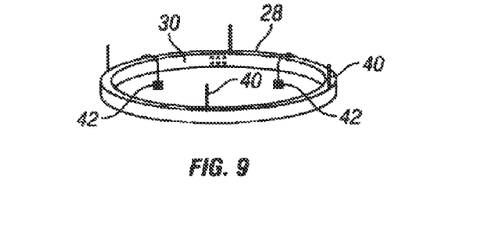
FIG. 9 representatively illustrates a perspective view of the separator ring.
Figure 10:
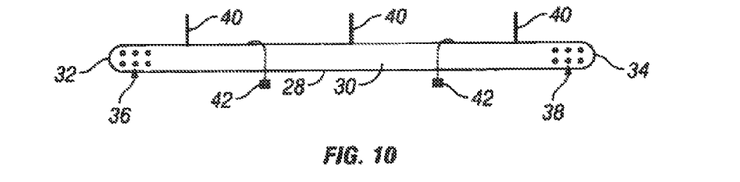
FIG. 10 representatively illustrates a side view of the separator ring with male and female adjustment mechanisms disengaged.

Once the separator ring 28 is in place around the lid 16 of the manhole structure 10, the surface composition 24 may be poured over the manhole structure 10, including the ring 12 and the lid 16, and the collar 22 to form a secondary lid 44 surrounded by a surround 46 (as shown in FIG. 7). Because the separator ring 28 may be in place while the surface composition 24 is being poured, the space occupied by the separator ring 28 may be free of the surface composition 24. The secondary lid 44 and the surround 46 each have a height that is approximately equal to the height of the resurfaced road 18. This eliminates the need for adjusting the height of the ring 12 of the manhole structure 10. When the surface composition 24 starts to cure, the separator ring 28 may be lifted out of place using the handle 40 and the lifting hole plugs 42 may be removed. The secondary lid 44 may be lifted off when desired in the same fashion as the lid 16 of the manhole structure 10. The edges of the secondary lid 44 may be smoothed out with an appropriate tool and the surface composition 24 is allowed to cure. The road 18 may be ready to be opened in as little as 20 minutes. As a result, there is a substantial reduction in the time and labor required to resurface the road 18.

When the road 18 is being resurfaced, the embodiments described herein may result in a significant reduction of costs. There may no longer be a need to locate, uncover, remove, and replace prior collars and/or to adjust manhole ring heights, which may result in significant savings in time and labor since a single trade contractor may complete the project. By covering the manhole lid 16, the manhole ring 12, and the collar 22 during resurfacing and then pouring the surface composition 24 onto the uncovered manhole lid 16, the manhole ring 12, and the collar 22, the manhole structure 10 and the collar 22 may be raised, leveled, and strengthened in a single process. In addition, the possibility of breakage and associated repair expenses may be reduced. Further, this same process may be repeated whenever the road 18 is resurfaced in the future.

The surface composition 24 may reduce the incidence of damage caused by the deterioration of the collar 22. The surface composition 24 on the lid 16 may have a cushioning effect which protects the ring 12 from harsh shocks which are typically a major cause of ring failure. In some embodiments, the surface composition 24 may have the long-term advantage of shock absorption relative to the foreshortened longevity of the stiff, inflexible crown, frame, and ring of the manhole structure. The surface composition 24 may also improve driver comfort upon vehicle passage over the repair. In another aspect of the present technology, the surface composition 24 may be easily applied to any size or shape of opening and/or in any surrounding surface including asphalt, concrete or even brick as in junction box repair.

Personnel responsible for roadways have observed that leveling five manhole lids by the inventive method in approximately two hours and at a total cost, including materials and labor, of $500. Using a prior method, the same project would have taken roughly a day and a half and, after the costs associated with permits, barriers and labor, would have cost between $3,000 and $4,000. These repairs have now been in place for approximately one year and show no signs of wear and tear.

Personnel provided another comparison. The manhole lid-surround leveling process was completed using the disclosed method and took approximately 20 minutes at a total material cost of $75. In contrast, personnel said the typical cost for such a repair would be about $500. Also leveling a junction box and valve cover boxes cost approximately $50 using the inventive process but would cost several hundred dollars to do conventionally.

Exemplary methods of applying the surface composition to the surface may comprise overlaying the surface with the surface composition to create a safety flooring. Conventional surfaces with limited slip resistance may be hazardous to humans in wet conditions and/or uncomfortable or hazardous for hooved animals such as cattle, sheep, hogs and horses that are unable to gain sufficient traction and become more susceptible to harm resulting from falls. Conventional flooring surfaces that attempt to improve the coefficient of friction may be expensive and/or ineffective. For example, concrete which has been grooved or brushed when poured in an effort to create a slip resistant surface may fill with manure and become slippery negating any benefits of the surface treatment.

In some embodiments, the surface composition may be permanently affixed to the subsurface (ie., the surface receiving the overlay of surface composition), reducing and/or eliminating the need for periodic removal of an overlaid material to clean and or disinfect the surface. In various embodiments, the surface composition may be substantially impervious to corrosive or otherwise damaging chemical agents such as petroleum fuels, chlorine, alcohol and others chemicals. In one embodiment, the surface composition may be prefabricated as a portable safety flooring.

Various embodiments of the present technology may provide a safety flooring that may reduce the cost and/or time involved to install, service, and/or repair flooring surfaces, traffic areas, holding pens, and the like. In some embodiments, the safety flooring may create a durable, long lasting, and waterproof safety surface over any suitable existing surface such as an asphalt, concrete, wood, dirt, or gravel walkway, driveway, ramp, deck or the like.

A safety flooring system according to various aspects of the present technology may comprise a surface composition comprising one or more of the liquid binder, the catalyst, additives, the primer, and/or the filler material. For example, the surface composition may comprise multiple constituents mixed together and allowed to cure into a completed surface. In various embodiments, the ingredients and/or amount of ingredients in the surface composition may be varied to controllably adjust any desired element of the safety flooring system such as a final hardness of the surface, a surface texture, heat transfer, and a cure time for the surface composition.

The surface composition may comprise any suitable composition having an initial viscosity level that allows the filler material to flow freely into any opening in, around and/or under the surface receiving the safety flooring system. Subsequently, the filler material may undergo a catalytic reaction causing the viscosity level to increase substantially such that the surface composition becomes significantly more solid after curing. The cured surface composition may also exhibit exceptional strength, elongation, compression, slip resistance, sound absorption, and/or pathogen resistance attributes. For example, in one embodiment, the cured surface composition may comprise a coarse finish across the top of the completed surface that may reduce the potential for humans and/or animals to slip while walking across the completed surface whether wet or dry. In another embodiment, the cured surface composition may comprise a smooth compressible surface suitably adapted to provide increased comfort in an area such as a holding pen for animals. In addition, the surface composition may also be adapted to provide a completed surface that is waterproof and/or substantially impermeable to moisture and/or chemicals to facilitate effective and easy cleaning.

In an exemplary method of applying the surface composition to the flooring, the primer may be applied to the surface. The first and second components of the liquid binder, with or without the filler material such as rubber crumb, may be mixed and poured over the existing surface flooring. In one embodiment, the filler material may be spread over, worked into, or otherwise applied to the surface composition during the cure time. The filler material, such as rubber crumb, may be comprise a material suitable for providing a slip resistant surface texture. In various embodiments, the size (ie., approximate or average diameter) of the filler material particles may be chosen according to a desired application. For example, larger filler material particles may be used to create a more coarse surface texture finish that may provide adequate traction for human and/or animal traffic while smaller filler material particles may create a smoother finish that provide greater comfort such as compressibility. In some embodiments, the filler material may adsorb into the curing surface composition applied over the surface composition.

Figure 12:
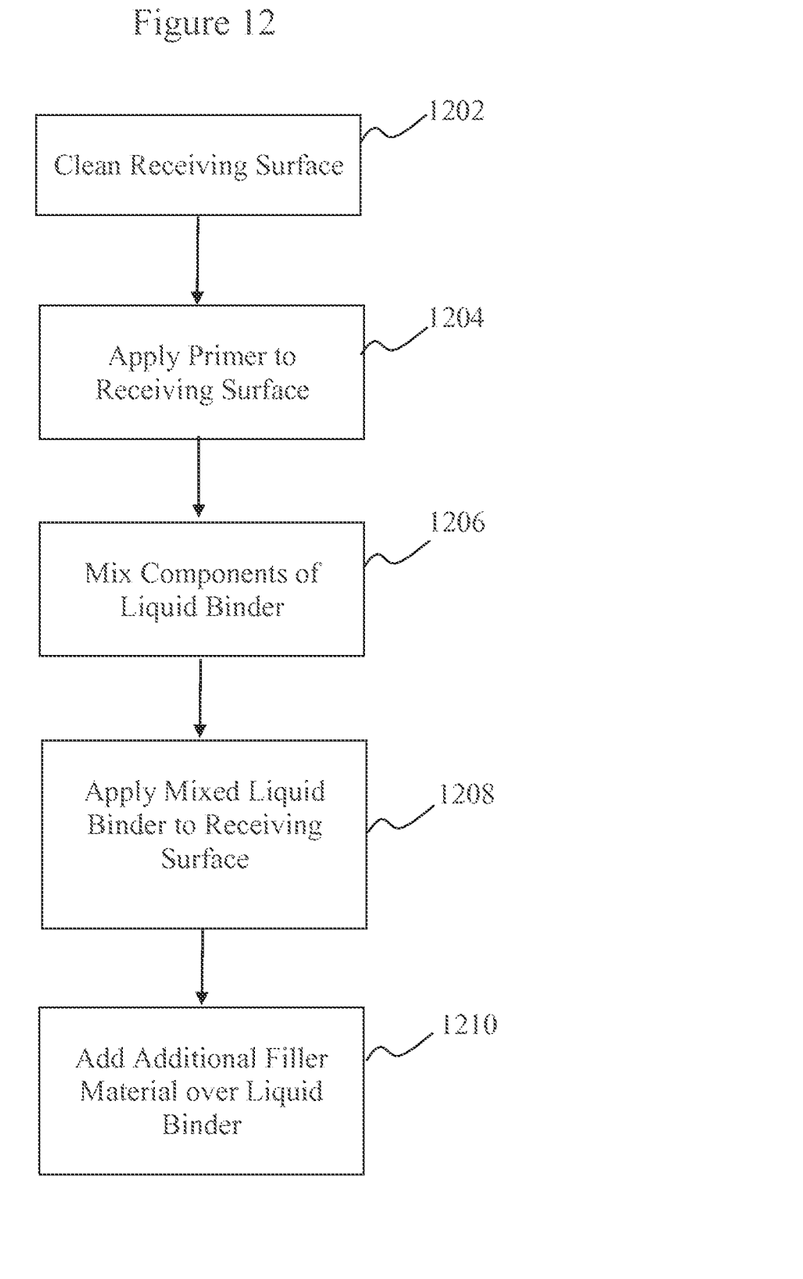
FIG. 12 is a flow chart illustrating an exemplary method of forming a safety flooring.

Referring now to FIG. 12, the method may comprise cleaning the surface receiving the surface composition, which may comprise removing loose debris from the area to be repaired (1202). If the surface composition is to be applied over a loose, granular surface such as dirt, clay, sand, decomposed granite, etc., a layer of plastic board may be place over the loose surface and fastened in place so as to create a stable platform for application of the surface composition. For example, in one embodiment, a backer board material may be used to create an area where the surface composition will be positioned such as is conventionally performed when pouring a concrete foundation or floor.

After cleaning, the surface may be primed with the primer, such as a flexible epoxy, that need not be applied over a dry surface (1204). This epoxy primer may adhere to any stable surface such as wood, metal, concrete, asphalt, etc. The primer may be followed by application of the liquid binder. In some embodiments, the filler material may be applied to the primed surface in advance of the liquid binder. In other embodiments, the filler material may be mixed into the liquid binder and then applied over the primed surface.

Once the surface is prepped, the first and second components of the liquid binder may be mixed together (1206). In embodiments of the liquid binder where the catalyst is included in the first component, the exothermic curing process may begin upon mixing the first component and the second component. In this embodiment, additional catalyst may be sprayed over the liquid binder after it is distributed across the surface to accelerate curing. In other embodiments, the catalyst may be absent from the liquid binder and may be added by spraying the catalyst over the liquid binder after it is distributed across the surface. During the cure time, the first and second components may be poured or otherwise applied to the surface to form the safety flooring surface (1208). Prior to the completion of the cure, additional filler material such as rubber crumb may be applied to the surface composition in any suitable manner such that the filler material adsorbs and bonds to the liquid binder thereby forming a finished surface (1210). In some embodiments, if the human and/or animal traffic gradually wears through the filler material applied to the surface of the surface material, deeper layers of filler material may continue to provide traction in other embodiments where filler material was mixed with the liquid binder prior to curing.

In the foregoing description, the invention has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition, system, or apparatus that comprises a list of elements does not include only those elements recited, but may also include other elements not expressly listed or inherent to such process, method, article, composition, system, or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present invention has been described above with reference to an exemplary embodiment. However, changes and modifications may be made to the exemplary embodiment without departing from the scope of the present invention. These and other changes or modifications are intended to be included within the scope of the present invention.

What is claimed is:

1. A surface composition for application to at least one of a roadway void and a flooring for traffic, the surface composition comprising:
   a liquid binder comprising a polyurethane adapted to cure through an exothermic reaction process, wherein the cured liquid binder has an increased viscosity relative to the liquid binder prior to curing; and
   a primer adapted to adhere to the cured liquid binder and the at least one of the roadway void and the flooring;
   wherein the surface composition applied to the roadway void and the flooring is adapted to withstand wear from the traffic over the roadway void and the flooring.

2. The surface composition of claim 1, further comprising a filler material, wherein the filler material is mixed with the liquid binder.

3. The surface composition of claim 2, wherein the filler material comprises at least one of an aggregate material, rubber particles, asphalt particles, sand, ceramics, glass, marble, rock, and gravel particles.

4. The surface composition of claim 1, wherein the liquid binder comprises a first component comprising a polyol and a second component comprising an isocyanate, wherein the exothermic reaction is initiated upon at least one of: (1) the mixing of the first component and the second component and (2) the exposure of the liquid binder to air.

5. The surface composition of claim 4, wherein the first component further comprises a catalyst.

6. The surface composition of claim 4, wherein the isocyanate comprises an aromatic isocyanate.

7. The surface composition of claim 1, further comprising an additive.

8. The surface composition of claim 7, wherein the additive comprises at least one of an antimicrobial composition, a surfactant, and a pigment.

9. The surface composition of claim 7, wherein the additive comprises an edge retention composition.

10. The surface composition of claim 1, wherein the primer comprises an epoxy.

11. A method for filling a roadway void comprising a cavity having a surface comprising the steps of:
 applying a primer to at least a portion of the cavity surface;
 filling the cavity with an amount of a liquid binder sufficient to be level with the roadway such that the liquid binder is in contact with and adheres to the primer,
  wherein the liquid binder comprises polyurethane adapted to cure through an exothermic reaction process, and
  wherein the cured liquid binder has an increased viscosity relative to the liquid binder prior to curing; and
 allowing a sufficient amount of time for the liquid binder to cure before resuming traffic over the roadway.

12. The method of claim 11, wherein loose debris is removed from the cavity prior to applying the primer.

13. The method of claim 11, wherein standing water is removed from the cavity prior to applying the primer.

14. The method of claim 11, wherein the primer is applied to the cavity surface with at least one of a brush, roller, and a spray to coat the cavity surface.

15. The method of claim 11, wherein the primer comprises an epoxy.

16. The method of claim 11, wherein the liquid binder comprises a first component comprising a polyol and a catalyst and a second component comprising an isocyanate, wherein the exothermic reaction is initiated upon at least one of: (1) the mixing of the first component and the second component and (2) the exposure of the liquid binder to air.

17. The method of claim 16, wherein the isocyanate is an aromatic isocyanate.

18. The method of claim 16, wherein the first component and the second component are mixed prior to filling the cavity.

19. The method of claim 11, further comprising mixing a filler material with the liquid binder prior to filling the cavity.

20. The method of claim 19, wherein the filler material comprises at least one of an aggregate material, rubber particles, asphalt particles, sand, ceramics, glass, marble, rock, and gravel particles.

21. The method of claim 11, wherein the time for the liquid binder to cure before traffic resumes is up to 20 minutes.

22. The method of claim 11, wherein the cavity is filled with the liquid binder within forty-eight hours of the application of the primer to the cavity surface.

23. A method for forming a safety flooring over a surface for at least one of human traffic and animal traffic comprising the steps of:
 mixing a liquid binder with a filler material;
 applying a mixture of the liquid binder and the filler material over the surface, wherein the liquid binder comprises polyurethane adapted to cure through an exothermic reaction process, and wherein the cured liquid binder has an increased viscosity relative to the liquid binder prior to curing; and
 allowing a sufficient amount of time for the liquid binder to cure before resuming the at least one of the human traffic and the animal traffic over the surface.

24. The method of claim 23, wherein the filler material is adapted to provide slip resistance to the safety flooring.

25. The method of claim 23, wherein the filler material is adapted to provide compressibility to the safety flooring.

26. The method of claim 23, wherein the filler material is applied over a top surface of the liquid binder and adsorbs to the liquid binder prior to curing.

27. The method of claim 23, in which the step of curing the liquid binder comprises spraying the surface of the liquid binder with a catalyst.

28. The method of claim 23, wherein the liquid binder comprises a first component comprising a polyol and a second component comprising an isocyanate, wherein the exothermic reaction is initiated upon at least one of: (1) the mixing of the first component and the second component and (2) the exposure of the liquid binder to air.

29. The method of claim 28, wherein the first component further comprises a catalyst.

30. The method of claim 28, wherein the isocyanate is an aromatic isocyanate.

* * * * *